(12) United States Patent
Jangam et al.

(10) Patent No.: US 12,741,317 B2
(45) **Date of Patent: *Sep. 22, 2026**

(54) CONTROLLING STAINLESS STEEL GREEN BODY OBJECT DEFORMATION

(71) Applicant: PERIDOT PRINT LLC, Palo Alto, CA (US)

(72) Inventors: John Samuel Dilip Jangam, Palo Alto, CA (US); Thomas Anthony, Palo Alto, CA (US); Lihua Zhao, Palo Alto, CA (US); James McKinnell, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 18/037,920

(22) PCT Filed: Dec. 1, 2020

(86) PCT No.: PCT/US2020/062668

§ 371 (c)(1),
(2) Date: May 19, 2023

(87) PCT Pub. No.: WO2022/119555

PCT Pub. Date: Jun. 9, 2022

(65) Prior Publication Data

US 2024/0001446 A1 Jan. 4, 2024

(51) Int. Cl.
*B22F 10/62* (2021.01)
*B22F 1/05* (2022.01)
(Continued)

(52) U.S. Cl.
CPC ................ *B22F 10/62* (2021.01); *B22F 1/05* (2022.01); *B22F 1/103* (2022.01); *B22F 10/14* (2021.01);
(Continued)

(58) Field of Classification Search
CPC .................. B23K 15/086; B28B 1/001; B22F 2003/1057
See application file for complete search history.

(56) References Cited

U.S. PATENT DOCUMENTS 10,780,501 B2 9/2020 Wu et al.
2016/0271877 A1 9/2016 Suzuki et al.
(Continued)

FOREIGN PATENT DOCUMENTS

FR 3088017 A1 5/2020
WO WO8402483 * 7/1984
(Continued)

OTHER PUBLICATIONS

Cuevas, Alejandro, Schumann, Kimberly J., Simpson, Christopher J., and Vilupanur A. Ravi. “Aluminizing Of Stainless Steel.” Paper presented at the Corrosion 2012, Salt Lake City, Utah, Mar. 2012. (Year: 2012).*

*Primary Examiner* — Nicholas A Wang
(74) *Attorney, Agent, or Firm* — Dierker & Kavanaugh, P.C.

(57) ABSTRACT

A shaping composition for controlling deformation of a green body object can include from about 10 wt % to about 80 wt % liquid vehicle, and from about 10 wt % to about 90 wt % metal particulates. The metal particulates can include from about 35 wt % to about 90 wt % high melting point metal particles, from about 10 wt % to about 65 wt % aluminum alloy particles, and from about 0.1 wt % to about 10 wt % metal complex selected from an inorganic metal salt, an organic metal salt, or a metal oxide. The metal of the metal complex can include copper, iron, aluminum, chromium, titanium, cobalt, silver, gold, nickel, tin, or zinc.

10 Claims, 3 Drawing Sheets

(51) Int. Cl.

| | |
|---|---|
| ***B22F 1/103*** | (2022.01) |
| ***B22F 10/14*** | (2021.01) |
| ***B22F 10/64*** | (2021.01) |
| ***B33Y 10/00*** | (2015.01) |
| ***B33Y 40/20*** | (2020.01) |
| ***B33Y 70/10*** | (2020.01) |

(52) U.S. Cl.

CPC .............. *B22F 10/64* (2021.01); *B33Y 10/00* (2014.12); *B33Y 40/20* (2020.01); *B33Y 70/10* (2020.01); *B22F 2201/013* (2013.01); *B22F 2201/11* (2013.01); *B22F 2301/052* (2013.01); *B22F 2301/205* (2013.01); *B22F 2301/35* (2013.01); *B22F 2302/253* (2013.01); *B22F 2998/10* (2013.01); *B22F 2999/00* (2013.01)

(56) References Cited

U.S. PATENT DOCUMENTS

| | | | | |
|---|---|---|---|---|
| 2019/0111479 | A1* | 4/2019 | Kasperchik ............. | B22F 10/16 |
| 2019/0276923 | A1 | 9/2019 | Tanigawa et al. | |
| 2019/0338382 | A1 | 11/2019 | Fujiwara et al. | |

FOREIGN PATENT DOCUMENTS

| | | | |
|---|---|---|---|
| WO | WO2019156675 | * | 8/2019 |
| WO | 2020/046268 | A1 | 3/2020 |
| WO | 2020/190274 | A1 | 9/2020 |

* cited by examiner

400 applying a coating of shaping composition to a surface of a green body object at a surface location to counteract temperature induced deformation of the green body object, wherein the green body object includes stainless steel build particles bound together with build binder, and wherein the shaping composition includes metal particulates including from about 35 wt% to 100 wt% of high melting point metal particles

410 ramping-up temperature applied to the green body object though an intermediate temperature range where the high melting point metal particles interact with stainless steel build particles of the green body object, wherein the shaping composition counteracts temperature induced deformation of the green body object while the green body object is within the intermediate temperature range

420 fusing the green body object at a fusing temperature above the intermediate temperature range to form a fused metal object

CONTROLLING STAINLESS STEEL GREEN BODY OBJECT DEFORMATION

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of material. This is unlike other machining processes, which often rely upon the removal of material to create the final part. Some three-dimensional printing methods use chemical binders or adhesives to bind build materials together. Other three-dimensional printing methods involve partial sintering, melting, etc. of the build material. For some materials, partial melting may be accomplished using heat-assisted extrusion, and for some other materials curing or fusing may be accomplished using, for example, ultra-violet light or infrared light.

BRIEF DESCRIPTION OF THE DRAWINGS

FIG. 5 is a flow diagram of an example method of controlling green body object deformation in accordance with the present disclosure.

DETAILED DESCRIPTION

Figure 1:
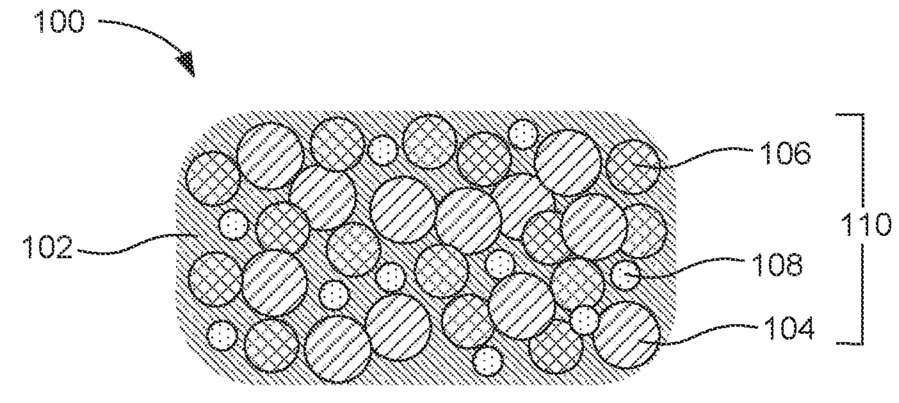
FIG. 1 illustrates an example shaping composition in accordance with the present disclosure.

Three-dimensional (3D) printing can be an additive process that can involve the application of successive layers of stainless steel build material with build binders or adhesives printed thereon to bind the successive layers of the stainless steel build materials together. In some processes, application of build binder can be utilized to form a green body object and then a fused three-dimensional physical object can be formed therefrom. More specifically, binding agent can be selectively applied to a layer of a stainless steel build material on a support bed to pattern a selected region of the layer and then another layer of the stainless steel build material is applied thereon. The binding agent can be applied to another layer of the stainless steel build material and these processes can be repeated to form a green part or object. The green body object can be sintered or otherwise heat-fused to form a fused metal object. However, during the heat-fusing process, with many green body objects prepared or printed with metal build particles and a build binder, the build binder may not be fully available while ramping the temperature of the fusing oven up to sintering or other fusing temperatures, as the build binder may burn off or otherwise may not be effective at binding at temperatures before stainless steel build material begins to become fused in earnest. Stainless steel can become highly fused at temperatures well above about 1300° C., and thus, some binders used to hold the green body object together are not effective at controlling sagging of cantilevered or spanned regions of the green body object as the temperature approaches these temperature. For example, as the temperature of the fusing oven exceeds about 900° C., stainless steel particle-to-particle necking (metallurgic inter-particle spans) can be observed to begin to increase, which starts to impart some added strength to the sintering part. Thus, at temperatures above about 900 C, it has been observed that the green body object typically has enough strength to start to become self-supportive, depending on the length of a given span or cantilevered structure that may be present. However, until this necking of particle-to-particle strength begins or becomes established, there is a temperature range where the green body object is subject to sagging. This sagging can be alleviated using support structures placed at locations where there may be an expectation of sagging. However, in accordance with examples of the present disclosure, shaping compositions can be applied to green body objects at strategic locations, coating thickness, and/or compositional makeup to provide for sag resistance, even when support structures may not be present.

In accordance with examples of the present disclosure, a shaping composition can include from about 10 wt % to about 80 wt % liquid vehicle and from about 20 wt % to about 90 wt % metal particulates. These weight percentages are based on the shaping composition as a whole. The metal particulates can include from about 35 wt % to about 90 wt % high melting point metal particles, from about 10 wt % to about 65 wt % aluminum alloy particles, and from about 0.1 wt % to about 10 wt % metal complex selected from an inorganic metal salt, an organic metal salt, or a metal oxide. The metal of the metal complex includes copper, iron, aluminum, chromium, titanium, cobalt, silver, gold, nickel, tin, or zinc. The weight percentages of the various particles of the metal particulates is based on the total concentration of the metal particulates per se, excluding the liquid vehicle component, for example. In several specific examples, the high melting point metal particles can be stainless steel particles, cast iron particles, Ti-6Al-4V particles, and/or nickel particles. The aluminum alloy particles can be aluminum-silicon particles or aluminum-silicon-magnesium particles. In one specific example, the metal complex can include aluminum oxide.

In another example, a three-dimensional printing kit can include a stainless steel build material including about 80 wt % to 100 wt % stainless steel build particles having a D50 particle size distribution value from about 1 μm to about 150 μm, and can further include a binding agent including a build binder to apply to stainless steel build material layers to form a green body object. The three-dimensional printing kit can also include a shaping composition to apply to a surface of the green body object and to control green body object deformation. The shaping composition can include from about 10 wt % to about 80 wt % liquid vehicle and from about 20 wt % to about 90 wt % metal particulates, based on a total weight of the shaping composition. Regarding the metal particulates in the shaping composition specifically, the metal particulates include about 35 wt % to 100 wt % high melting point metal particles that are interactive with a surface of the green body object to ameliorate deformation of the green body object within an intermediate temperature range where the build binder is not effective at retaining the green body object shape prior to the stainless steel build particles becoming heat-fused. In one example, the high melting point metal particles are metal alloy particles, and wherein the shaping composition further includes from about 10 wt % to about 65 wt % aluminum alloy particles.

In another example, the shaping composition can include from about 0.1 wt % to about 10 wt % metal complex selected from an inorganic metal salt, an organic metal salt, or a metal oxide, and wherein the metal of the metal complex includes copper, iron, aluminum, chromium, titanium, cobalt, silver, gold, nickel, tin, or zinc. The high melting point metal particles can be selected from stainless steel particles, Ti-6Al-4V particles, aluminum-silicon-magnesium particles, cast iron particles, nickel particles, or a combination thereof.

In another example, a method of controlling green body object deformation can include applying a coating of shaping composition to a surface of a green body object at a surface location to counteract temperature induced deformation of the green body object. The green body object can include stainless steel build particles bound together with build binder, and the shaping composition can include metal particulates including from about 35 wt % to 100 wt % of high melting point metal particles. The method can further include ramping-up a temperature applied to the green body object through an intermediate temperature range where the high melting point metal particles interact with stainless steel build particles of the green body object. The shaping composition can counteract temperature induced deformation of the green body object that may occur while the green body object is within the intermediate temperature range. The method can further include fusing the green body object at a fusing temperature above the intermediate temperature range to form a fused metal object. In one example, the method can further include forming the green body object by iteratively applying individual stainless steel build material layers of a stainless steel build material including the stainless steel build particles, and based on the three-dimensional object model, selectively applying a binding agent to individual stainless steel build material layers to define individually patterned layers that are built up and bound together to form the green body object. In another example, the shaping composition can also include from about 10 wt % to about 65 wt % aluminum alloy particles and/or from about 0.1 wt % to about 10 wt % metal complex selected from an inorganic metal salt, an organic metal salt, or a metal oxide, wherein the metal of the metal complex includes copper, iron, aluminum, chromium, titanium, cobalt, silver, gold, nickel, tin, or zinc. In some instances, the method can include removing residual components of the shaping composition from the fused metal object. However, in other examples, the high melting point metal particles (or a portion thereof) can become integrated onto a surface of the fused metal object.

It is noted that when discussing the shaping compositions, the three-dimensional printing kits, and/or the methods herein, these discussions can be considered applicable to one another whether or not they are explicitly discussed in the context of that example. Thus, for example, when discussing high melting point metal particles of the shaping composition, such disclosure is also relevant to and directly supported in the context of the three-dimensional printing kits and methods, and vice versa, regardless of any scope of description differences.

It is also understood that terms used herein will take on their ordinary meaning in the relevant technical field unless specified otherwise. In some instances, there are terms defined more specifically throughout the specification or included at the end of the present specification, and thus, these terms can have a meaning as described herein.

Shaping Compositions

In accordance with examples of the present disclosure, a shaping composition 100 for three-dimensional metal object formation is shown by way of example in FIG. 1. The shaping composition can include a liquid vehicle 102 and metal particles 110. The metal particles can include high melting point metal particles 104, aluminum alloy particles 106, and a metal complex 108 selected from an inorganic metal salt, an organic metal salt, or a metal oxide. Notably, in some examples, the metal particles can be all high melting point particles (excluding trace components), or the metal particles can be a mixture of the high melting point particles and one of the aluminum alloy particles of the metal complex. The term "high melting point metal particles" is defined herein to include elemental metal particles or metal alloy particles including a major component (more than a trace amount, e.g., 5 wt % or more) having a melting point from about 1000° C. to 4000° C. In the case of elemental metal particles, the melting point of the elemental metal can be from about 1000° C. to 4000° C. For example, nickel particles can be considered to be high melting point metal particles because nickel has a melting point of about 1452° C. In the case of metal alloys, a high melting point metal particle includes any metal alloy with an alloyed component (at greater than about 5 wt %) with a melting temperature from about 1000° C. to 4000° C. For example, stainless steel and cast iron are considered to be high melting point metal particles because iron has a melting point of about 1538° C. Ti6Al4V is considered as high melting point metal particles because titanium has a melting point of about 1668° C. Likewise, alloys of aluminum and silicon (AlSiMg or AlSi) are considered to be high melting point metal particles because silicon has a melting point of about 1414° C. Table 1 below provides a list of metals that can be present as or included as alloys in the high melting point metal particles in accordance with examples of the present disclosure.

TABLE 1

Example Components of High Melting Point Metal Particles

| Metal or Metalloid Components | Melting Temperature (° C.) |
|---|---|
| Gold | 1063 |
| Copper | 1083 |
| *Silicon | 1414 |
| Nickel | 1452 |
| Cobalt | 1495 |
| Iron | 1538 |
| Titanium | 1668 |
| Vanadium | 1910 |
| Chromium | 1930 |
| Molybdenum | 2623 |
| Tantalum | 3020 |
| Tungsten | 3422 |

*Silicon is a metalloid that can be used to form high melting point metal particles.

Several different formulations can be prepared using one or more of these metals or metalloids as the component for the high melting point metal particles. One example may include the following by way of example: Metal Particles Formulation 1—a mixture of metal particles of stainless steel, aluminum-silicon (or aluminum-silicon-magnesium) alloy, and aluminum oxide; Metal Particles Formulation 2—a mixture of metal particles of Ti6Al4V, aluminum-silicon (or aluminum-silicon-magnesium) alloy, and aluminum oxide; Metal Particles Formulation 3—aluminum-silicon-magnesium alloy; Metal Particles Formulation 4—cast iron; or Metal Particles Formulation 5—nickel. There are other examples and combinations of metal particles that can be used, but these are provided by way of example.

In some examples, the shaping composition can include a shaping binder (not shown), such as a reducible-metal compound shaping binder or a polymeric or polymerizable shaping binder. The term "shaping binder" is used to distinguish the binder used in the shaping composition from the binder that may be used in the binding agent used to form the green body object during a three-dimensional object build. Thus, the latter binder mentioned can be referred to as a "build binder," as it is used to build the green body object. As the shaping binder and the build binder can be selected from a common list of compounds, e.g., polymer, reducible-metal compounds, etc., sometimes the simple term "binder" is used herein, but it is understood to be one or the other type of binder based on context. If the context allows for it to mean both types of binder, than the term can be applicable to both types of binder. As mentioned, in accordance with examples of the present disclosure, shaping compositions described herein can be applied to green body objects formed of metal particles on surfaces thereof at strategic locations and coating thickness, considering compositional makeup fusing temperature profiles, e.g., heat ramp-up timing to sintering temperatures, to counteract unwanted part sagging or other unwanted deformation. Thus, it can be said that undesirable deformations that can occur due to the heat-fusing process, e.g., due to gravity, can be counteracted by positive shaping composition-induced surface support provided by appropriate application of the shaping compositions described herein.

The high melting point metal particles 104, the aluminum alloy particles 106 (if present) and/or metal complex 108 (if present) can be thermally stable in the shaping composition to a temperature from about 250° C. to about 500° C., up to about 600° C., or up to about 700° C., for example, but can also be interactive at a temperature from about 500° C. to about 1000° C., from about 600° C. to about 1000° C., or from about 700° C. to about 1000° C. The term "interactive" when referring to the metal particles of any type described herein refers to various chemical or physical reactions that can occur between multiple metals or alloys when exposed to heat, such as at shaping temperatures, $T_{shape}$, described herein. For example, multiple metals of a shaping composition, or more specifically metal particles of the shaping composition, in some instances, can be exothermically reactive with one another when exposed to heat. Alternatively, one metal or multiple metals of the shaping composition can be interactive with metal build particles of the green body object, e.g., aluminum and/or other metals can alloy at a surface of the green body object with metal build particles thereof. Whether exothermically reactive, physically reactive, or some other interaction occurs between metals or alloys of different particles at a surface of the green body object, the heat (of the furnace and/or exothermic heat of the reaction, etc.) at the surface of the green body object during ramp-up to fusing temperature, $T_{fuse}$, can provide stability to the green body object.

To provide a few mechanisms of reaction or interaction with the green body object when ramping up temperatures through an intermediate temperature to sintering temperatures, Metal Particles Formulation 1 described above can be considered. In this example, the aluminum of the aluminum-silicon-magnesium alloy in the shaping compositions starts to sinter at a relatively lower temperature (compared to other metals) and metallurgically bonds to the surrounding stainless steel particles of the shaping composition and the stainless steel at the surface of the green body object. Assuming the use of a polymeric build binder to form the green body object, a debinding stage where build binder begins to burn off of the green body object, e.g., at 400 C, a weak green body object remains. The green body object may hold its shape by particle interlocking and Vander wall forces. However, at slightly higher temperatures, the aluminum alloy particles may begin to densify and increase bonding strength between the stainless steel and $Al_2O_3$ powder particles that are also present. The sintered aluminum-silicon-magnesium alloy on the green body object firmly holds the otherwise fragile green body object intact, supporting the part from sag or distortion up to about 600° C., for example. At a temperature around ~600° C. (or slightly lower due to the presence of the silicon), the aluminum-silicon-magnesium may react with the iron in the stainless steel and form a network of a Fe—Al intermetallic, connecting the stainless steel particles. As temperatures are ramped up through intermediate temperatures to sintering temperatures, the reaction of the Fe—Al intermetallic may continue and consume the aluminum-silicon-magnesium alloy. For example, at a temperature higher than about 577° C., the aluminum-silicon-magnesium alloy melts, and liquid aluminum may occupy the spaces between the Fe—Al intermetallic network and coat the stainless steel particle of the shaping composition and/or the stainless steel particles at the surface of the green body object. This Fe—Al intermetallic network of metal can hold on to the stainless steel green body object during sintering stages. For example, at temperatures above about 900° C., the stainless steel particles start to form micro necks. As sintering progresses, these micro necks grow in size and impart strength to the now solidifying green body object. Based on observations, there appears to be a symbiotic relationship between the intermetallic network and the sintering green body object (now becoming a fused metal object) in providing support and avoiding sag or distortion of the green body object while the temperature is ramping up. After cooling and removal of the fused metal object, the shaping composition can be removed easily by brushing, scraping, sand blasting, etc., away the residual material.

In another example, Metal Particles Formulation 2 described above can be considered. In this example, the aluminum of the aluminum-silicon-magnesium alloy in the shaping compositions starts to sinter at a relatively lower temperature (compared to other metals) and metallurgically bonds to the surrounding stainless steel particles of the shaping composition and the stainless steel at the surface of the green body object. Assuming the use of a polymeric build binder to form the green body object, a debinding stage where build binder begins to burn off of the green body object, e.g., at 400° C., a weak green body object remains. The green body object may hold its shape by particle interlocking and Vander wall forces. However, at slightly higher temperatures, the aluminum alloy particles may begin to densify and increase bonding strength between the stainless steel and $Al_2O_3$ powder particles that are also present. The sintered aluminum-silicon-magnesium alloy on the green body object firmly holds the otherwise fragile green body object intact, supporting the part from sag or distortion up to about 577° C., for example. At a temperature around ~600° C. (or slightly lower due to the presence of the silicon), the aluminum-silicon-magnesium may react with the Ti6Al4V particles of the shaping composition and form a connecting channel of an Al3Ti intermetallic. As the temperature increases, the interdiffusion of aluminum and titanium through $Al_3Ti$ channels allows the formation of AlTi and $Ti_3Al$ intermetallics in the shaping composition. At higher temperatures above about 650° C., unreacted aluminum-silicon-magnesium alloy melts, and liquid phase sintering occurs. Molten aluminum-silicon-magnesium now coats the Ti6Al4V particles and continues the reacting to form intermetallic $Ti_3Al/TiAl/Al_3Ti$ on the top surface of the green body object. Along with Al—Ti intermetallics, the aluminum-silicon-magnesium and Ti6Al4V, which is in contact with the stainless steel surface, can react at the interface forming Fe—Al intermetallics as well. Unlike the porous network of Fe—Al intermetallic coating, Al—Ti intermetallic forms a solid shell on top of the part to provide support to the green body object, which assists in avoiding sagging. At temperatures above about 900° C., the stainless steel particles start to form micro necks. As sintering progresses, these micro necks grow in size and impart strength to the now solidifying green body object. Based on observations, there appears to be a symbiotic relationship between the intermetallic coating and the sintering green body object (now becoming a fused metal object) in providing support and avoiding sag or distortion of the green body object while the temperature is ramping up. After cooling and removal of the fused metal object, the shaping composition can be removed easily by brushing and/or scraping away the residual material.

As another example, an alloy of aluminum and silicon can be useful, such as the aluminum-silicon-magnesium shown as Metal Particles Formulation 3. The silicon, which is the high melting point component that makes aluminum-silicon alloys high melting point metal particles, can reduce the melting temperature of the aluminum to about 577° C. instead of about 660° C. When the aluminum melts, it becomes available to react with the iron or titanium) that can be present in the stainless steel build material, forming inter metallic FeAl and/or TiAl. Thus, the aluminum can act to stabilize the green body object at a lower temperature than may otherwise be available as it is ramped up in temperature to a temperature where the green body object becomes more stable, e.g., the temperature where inter-particulate bridges begin to form and/or particles begin to swell prior to sintering temperatures. Other aluminum alloys that can be used, other than the aluminum-silicon-magnesium alloy of this particular example, include other alloys with a second component having a temperature ranging from about 1000° C. to about 3500° C., e.g., aluminum-silicon alloy, aluminum-manganese alloy, aluminum-zinc-magnesium, etc.

As another example, a cast iron alloy can also be useful for use as the metal particles of the shaping composition, such as the cast iron shown as Metal Particles Formulation 4. Cast iron has a lower melting temperature at about 1147° C.-1290° C. than stainless steel, e.g., stainless steel 316 (1390° C. to 1440° C.). Therefore, cast iron metal particles can start sintering earlier and to a greater extent than stainless steel at a lower temperature. As the cast iron powder particles sinter together, they also bond with the part on the surface and hold the part in shape. The cast iron coating may have a wider particle-to-particle bond length and can form a solid crust on top of the green body object through the intermediate temperatures during ramp up to sintering temperatures for the stainless steel build material particles. This solid crust can help to minimize distortion after debinding the stainless steel green body object. For example, as the temperature rises above 900° C., the stainless steel particle-to-particle bond length can increase, leading to an increase in strength of the object, and thus, it can support itself during later stages of sintering. During sintering, cast iron may start to melt at about 1147° C. and resides in a molten state on top of the stainless steel sintering object. Since cast iron metallurgically bonds to the green body object or sintering object, it can impart wear resistance to the stainless steel part surfaces, minimizing part distortion during sintering.

As another example, nickel particles can also be useful for use as the metal particles of the shaping composition, such as the nickel particles shown as Metal Particles Formulation 5. With nickel particles, they can form a bonded coating thereon that provides strength to the green body object before it is sintered, thus contributing to amelioration of sagging and other distortion that may otherwise occur while ramping the temperature of the sintering oven up through intermediate temperatures (prior to sintering temperatures). Interestingly, nickel has a higher melting temperature (1455° C.) than the sintering temperature of the stainless steel particles. As a result, the nickel particles may be solid throughout the sintering process. Nickel is metallurgically compatible with stainless steel, and thus, may remain as a coating on the heat fused metal object.

The metal particles of the shaping composition, regardless of their category, e.g., high melting point metal particles, aluminum alloy, metal complex, etc., can have a D50 particle size from about 1 μm to about 150 μm, from about 1 μm to about 100 μm, from about 2 μm to about 75 μm, or from about 5 μm to about 50 μm, for example.

In further detail, the shaping composition 100 can be in the form of a slurry, with the metal particles 110 admixed with a liquid vehicle 102. In addition to the liquid vehicle, the shaping composition can also include a shaping binder (not shown). For example, a blend of the metal particles and the shaping binder can be added to a liquid vehicle, or the liquid vehicle can be included with the metal particles/shaping binder blend as a fluid composition, e.g., paste, slurry, etc. The liquid vehicle and the shaping binder can be similar to that which is used in fluids that are applied to stainless steel build material for printing three-dimensional green objects, which is described in greater detail hereinafter. Thus, the description of liquid vehicle and build binder as it relates to printing three-dimensional objects presented hereinafter is relevant to the shaping compositions, and that description is incorporated herein by reference. In short, however, liquid vehicle and build binder can be used to form a binding agent.

The liquid vehicle 102 can be water or an aqueous liquid vehicle with other components, e.g., organic co-solvent, surfactant, biocide or fungicide, etc. The liquid vehicle can likewise be organic or non-aqueous, including from no water to de minimis concentrations of water, e.g., up to 5 wt %. The build binder can be a polymeric binder such as a latex binder, a polyurethane binder, or can be a reducible-metal compound binder, such as copper nitrate or other metal compound as described in greater detail hereinafter. The shaping binder can likewise be any of these types of binders, and can be present in the shaping composition at from about 2 wt % to about 30 wt %, from about 3 wt % to about 25 wt %, from about 3 wt % to about 20 wt %, from about 4 wt % to about 15 wt %, from about 2 wt % to about 10 wt %, or from about 2 wt % to about 8 wt %, for example. In further detail, the liquid vehicle can be present in the shaping composition at from about 10 wt % to about 80 wt %, from about 15 wt % to about 60 wt %, from about 20 wt % to about 50 wt %, or from about 25 wt % to about 50 wt %.

The shaping composition 100 can be self-supporting and/or self-adhesive to a green body object, and in some instances, self-adhesive to a green body object when oriented in any direction, counteracting or holding to green body object surfaces with gravitational pull working against the shaping composition location relative to a surface of the green body object. In one example, the shaping composition can have a viscosity from about 500 to about 800 cps, from about 800 cps to about 2000 cps, or from about 2000 cps to about 5000 cps. These more viscous shaping compositions can be applied by a mechanical applicator, such as a roller, a hard tool such as a spackle applicator or a blade, a blade coater, a Meyer rod coater, etc. With less viscous compositions, sprayers, jetting architecture, dip coaters, curtain coaters, or brushes, or the like can be used to apply the shaping compositions. Example viscosities for these types of shaping compositions can be from about 50 cps to about 250 cps, from about 50 cps to about 100 cps, or from about 100 cps to about 500 cps, for example. Viscosities outside these ranges can be used as well. Example coating thickness for the shaping compositions can be from about ½ mm to about 10 mm, from about 1 mm to about 8 mm, or from about 2 mm to about 5 mm.

Thus, with these properties and in accordance with the present disclosure, when the shaping composition has the correct formulation, thickness, and/or the like, and/or is applied at an appropriate location, the metal particulate mixture in the shaping composition, applied as a coating to a surface of the green body object, can provide an interaction, e.g., exothermic or other reactive or alloying interaction, with the surface to provide chemical, alloying, and/or exothermic reactive to the surface to counterbalance gravitational forces that lead to sagging, e.g., that may occur during heat-fusing while ramping the temperature up through intermediate temperatures. This chemical, physical, and/or exothermic reaction that occurs at a surface of the green body object can be referred to as "shaping composition-induced surface support," as it is applied to the surface and supports the original structure during heat fusing. That stated, in one specific example, it is noted that the shaping composition can be used to control green body object deformation by introducing new shapes to the green body object, e.g. 4D printing. This can be done by varying the compositional makeup of the shaping composition, including thicker coatings, and/or by placing the shaping composition at locations not intended to reduce deformation, etc., to introduce a new formation or shape beyond the green body object configuration as printed or otherwise formed. Thus, the shaping compositions can be used to "control" the green body object by introducing new shapes to the green body object beyond that which could be used for shape retention while at intermediate and fusing temperatures. For clarity, when referring to "controlling green body object deformation" or "controlling deformation," it is understood that controlling deformation may include retaining the intended shape of a green body object, but may also include using the shaping compositions to introduce a shape that is altered from the shape of the green body object, e.g. introduce a bulge or a recess or an angle to a green body object that is different than the green body object as printed.

Three-Dimensional Printing Kits and Systems

Figure 2:
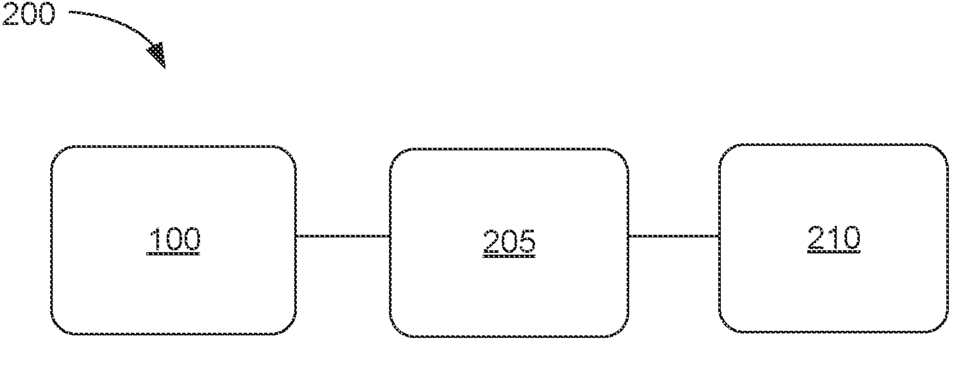
FIG. 2 illustrates an example three-dimensional printing kit in accordance with the present disclosure.

In accordance with examples of the present disclosure, a three-dimensional printing kit 200 is shown in FIG. 2. The three-dimensional printing kit can include a stainless steel build material 205 including about 80 wt % to 100 wt % metal build particles having a D50 particle size distribution value from about 1 μm to about 150 μm, a binding agent 210 to apply to stainless steel build material layers to form a green body object, and a shaping composition 100. The shaping composition can be as described with respect to FIG. 1 and elsewhere herein. For example, the shaping composition can include metal particles to apply to a surface of the green body object to introduce a shaping composition-induced surface support to the green body object when multiple metals of the metal particles interact upon application of heat, and/or as metal particles diffuse into one another or into or onto a surface of the metal build particles of the green body object. The shaping composition can, in some examples, include a liquid vehicle, e.g., from about 10 wt % to about 80 wt % liquid vehicle. The metal particles can be present at from about 20 wt % to about 90 wt % (collectively). In further detail, the shaping composition can also include a polymer shaping binder, a polymerizable shaping binder, and/or a reducible-metal compound shaping binder.

Figure 3:
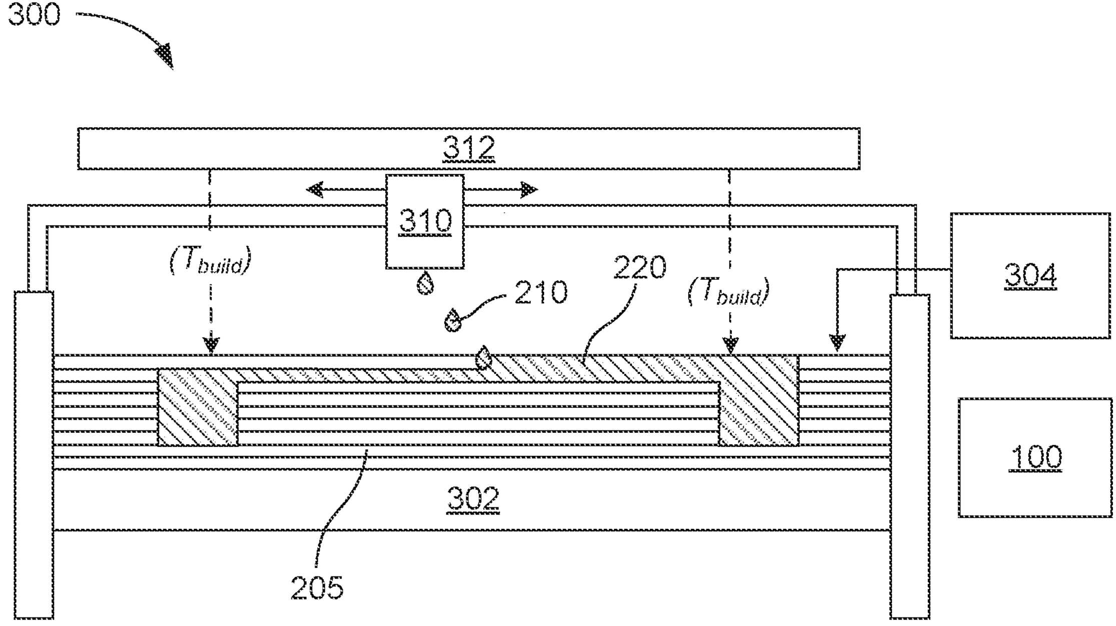
FIG. 3 illustrates an example three-dimensional printing kit associated with an additive manufacturing three-dimensional printer in accordance with the present disclosure.

In FIG. 3, the three-dimensional printing kit is shown with the stainless steel build material 205 and the binding agent 210 loaded in a three-dimensional printing apparatus 300. In this example the shaping composition 100 is shown next to the three-dimensional printing apparatus in preparation for applying to a green body object 220, once formed and removed from the build platform 302 and from within the stainless steel build material that is not used to form the green body object. In this example, the stainless steel build material can be deposited from a build material applicator 304 onto the build platform where it can be flattened or smoothed on a layer by layer basis, such as by a mechanical roller or other flattening technique. A layer of the stainless steel build material, which typically includes from mostly to all metal build particles, can be deposited and spread out evenly at the top surface. The layer of powder bed material can be from 25 μm to about 400 μm, from 75 μm to about 400 μm, from about 100 μm to about 400 μm, from about 150 μm to about 350 μm, or from about 200 μm to about 350 μm, for example. The binding agent can be used to generate the green body object on a layer-by-layer basis, for example. Individual layers of stainless steel build material and previously formed green body object layers are shown, but are not to scale. In this example, the binding agent may include water and a build binder, such as a reducible-metal compound build binder, e.g., copper nitrate or a polymeric or polymerizable build binder, e.g., latex particle binder or polyurethane binder, for example, and can be ejected onto the stainless steel build material from a fluid ejector 310, for example, to provide for selectively pattering the stainless steel build material. The location of the selective printing of the binding agent can be to a layer corresponding to a layer of a three-dimensional printed object, with information provided to print the respective layer provided by a three-dimensional object model or computer model, for example. A building temperature ($T_{build}$) or heat can be applied for building the green body object in some examples, e.g., from 50° C. to 200° C., but other examples may not use heat when building the green body object. If heat is used, heat can be provided from a heat source 312, at the various layers (or group of layers, or after the green body object is formed) to (i) facilitate the build binder curing process, and/or (ii) remove solvent from the binding agent, which can assist with more rapid solidification of individual layers. Removing solvent from the binding agent can also reduce the wicking period of the binding agent outside of the printed object boundary and allow for a more precise printed green part. In one example, heat can be applied from overhead, e.g., prior to application of the next layer of stainless steel build material, or after multiple layers are formed, etc., and/or can be provided by the build platform from beneath the stainless steel build material and/or from the stainless steel build material source (preheating stainless steel build material prior to dispensing on the build platform or previously applied three-dimensional object layer). As metal can be very good conductors of heat, when applying heat from below, care can be taken to heat to levels that do not decompose the build binder, in some examples. After individual layers are printed with binding agent, the build platform can be dropped a distance corresponding to a thickness of the applied layer of stainless steel build material, e.g., about 50 μm to about 200 μm, so that another layer of the stainless steel build material can be added thereon and printed with the binding agent, etc. The process can be repeated on a layer by layer basis until a green body object is formed that is stable enough to move to an oven suitable for fusing, e.g., sintering, annealing, melting, or the like. In this example, in addition to the green body object formed, there are also green body object supports 222 that are also printed, which are used in this example for example purposes in testing the shaping characteristics of the green body object prepared in accordance with the present disclosure.

Fusing Green Body Objects with Shaping Composition-Induced Surface Support

Green body objects, such as those prepared using three-dimensional printing or other additive manufacturing, can be heat-fused to form fused metal objects. However, after forming the green body object, there is an opportunity for additional shaping to take place prior to heat-fusing the green body object into the fused metal object. As used herein "green body object" (as a complete object mass, plurality of object layers, or even an individual layer) refers to additive components including unfused metal particles and typically a build binder of some type held together in the form of a three-dimensional shape, but which has not yet been heat-fused, e.g., not heat sintered or annealed to fuse the metal particles together. As a green body, the stainless steel build material can be (weakly) bound together by a binding agent. Typically, a mechanical strength of the green body is such that the green body can be handled or extracted from a build platform to place in a fusing oven. It is to be understood that any stainless steel build material that is not patterned with the binding agent is not considered to be part of the green body, even if the stainless steel build material is adjacent to or surrounds the green body. For example, unprinted stainless steel build material can act to support the green body while contained therein, but the stainless steel build material is not part of the green body unless the stainless steel build material is printed with binding agent, or some other fluid that is used to generate a solidified part prior to fusing, e.g., sintering, annealing, melting, etc. Furthermore, green body objects tend to be somewhat fragile with rigidity lower than the metal part that is to be ultimately formed upon heat-fusing the green body object. Once the green part or green body object is fused, the part or body object can be referred to as a "fused metal object."

The terms "fuse," "fused," "fusing," or the like refers to stainless steel metal build particles of a green body object that have become heat-joined at high temperatures, depending on a variety of variables, e.g., particle size, type of stainless steel, metal purity, weight percent of metal content, etc. Fusing may be in the form of melting, sintering, annealing, etc., of the metal particles, and can include a complete fusing of adjacent particles into a common structure, e.g., melting together, or can include surface fusing where particles are not fully melted to a point of liquefaction, but which allow for individual particles of the stainless steel build material to become bound to one another, e.g., forming material bridges between particles at or near a point of contact. Fusing can include particles becoming melted together as a unitary solid mass, or can include surfaces of metal build particles becoming softened or melted to join together at particle interfaces. In either case, the metal build particles become joined and the fused metal object can be handled and/or used as a rigid part or object without the fragility of the green body object.

Sintering of metal build particles is one form of metal particle fusing. Annealing is another form of metal particle fusing. A third type of fusing includes melting metal build particles together to form a unitary mass. The terms "sinter," "sintered," "sintering," or the like refers to the consolidation and physical bonding of the metal build particles together (after temporary binding using the binding agent) by solid state diffusion bonding, partial melting of metal build particles, or a combination of solid state diffusion bonding and partial melting. The term "anneal" refers to a heating and cooling sequence that controls the heating process, and the cooling process, e.g., slowing cooling in some instances, to remove internal stresses and/or toughen the fused metal object.

When sintering or annealing, for example, an acceptable sintering temperature range for stainless steel may be from about 1300° C. to about 1520° C., depending on the grade of stainless steel used, considering elemental metal ratios, impurities, particle size, time of heat soak, etc. In further detail, if sintering or annealing, the temperature range can vary, depending on the material, but in one example, the sintering temperature can range from about 10° C. below the melting temperature of the stainless steel build particles to about 60° C. or 80° C. below the melting temperature of the stainless steel build material (with time sintering or soaking, material purity, etc., being considered). In one example, a temperature can be used during a heat soak period to sinter and/or otherwise fuse the metal build particles to form the fused metal object. Heat soaking time frames for sintering can be from about 5 minutes to about 2 hours, from about 10 minutes to about an hour, or from about 15 minutes to about 45 minutes, for example.

Figure 4:
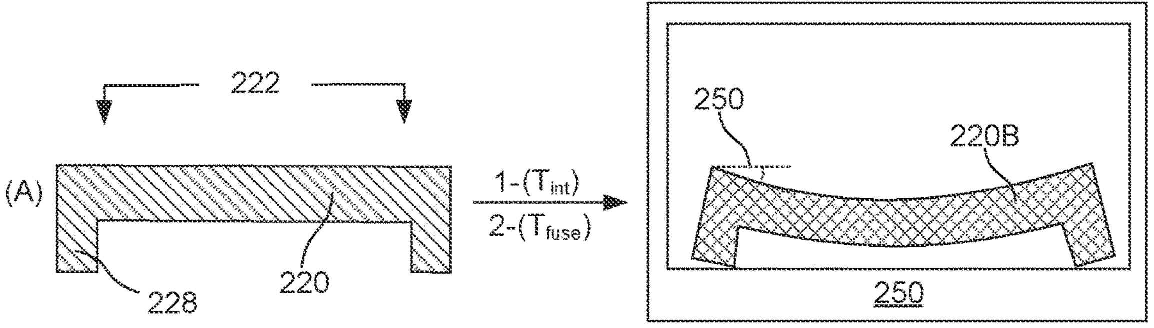
FIG. 4 illustrates green body objects prepared using the example shaping compositions of the present disclosure compared to green body objects prepared without using the shaping compositions of the present disclosure.
Figure 4:
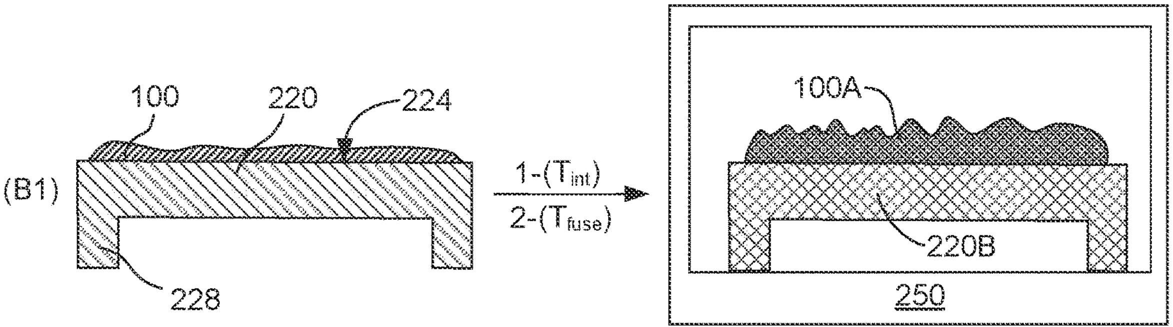
Figure 4:
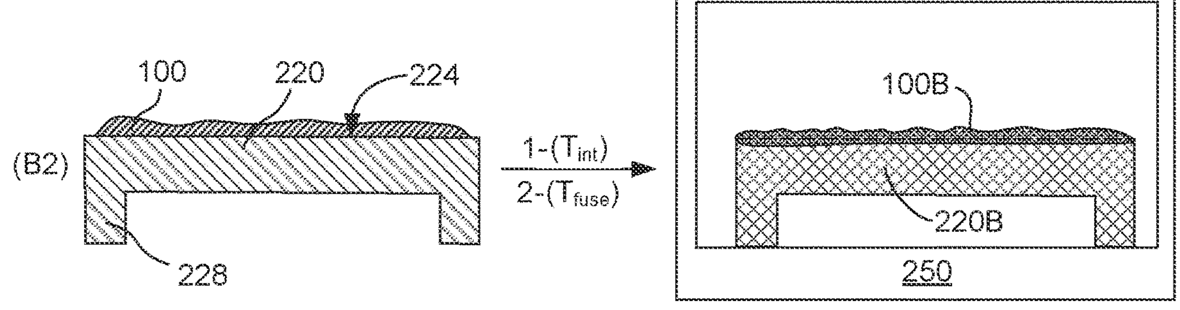

When heating green body objects, the temperature within the fusing oven can be raised from an initial temperature, $T_0$, to an intermediate temperature, $T_{int}$, during heat ramp-up, to a fusing temperature, $T_{fuse}$, to heat-fuse the metal build particles. While ramping-up the temperature, and even in some cases while at fusing temperatures, green body objects that include cantilevered portions or portions that span multiple supports can sag with temperature increase. To show this effect, FIG. 4 depicts three green body objects 220 that are three-dimensionally printed using stainless steel. The spans 222 of these objects may be about 33 mm with a vertical thickness of about 5.7 mm, and are supported by legs 228 positioned at opposing distal ends of the span. The green body objects are placed in a fusing oven 250 and ramped up in temperature to fuse the green body to form a fused metal object 220B. The samples are heated through an intermediate temperature, $T_{int}$, short of a target fusing temperature, $T_{fuse}$, and then heat-fused at a sintering temperature. As shown at (A) where no shaping composition is applied, the object becomes deformed as the span sags, as there is not enough support to retain the shape of the green body object. The angle of deflection 250 is shown, which can vary, depending on the materials and dimension of the object. As shown at (B), a shaping composition 100, such as that shown at Metal Particle Formulations 1 or 2, is applied as a slurry to a top surface 224 of the green body object. After passing through intermediate temperatures and then to sintering temperatures, the fused metal object 220B retains its shape. The residual shaping composition 110A in this example can be easily removed by brushing powder from the surface of the fused metal object. As shown at (C), a shaping composition 100, such as that shown at Metal Particle Formulations 3-5, is applied as a slurry to a top surface 224 of the green body object. After passing through intermediate temperatures and then to sintering temperatures, the fused metal object 220B retains its shape. As shown in this particular example, assuming the shaping composition used was a slurry of nickel particles, the residual shaping composition 110B in this example can remain on the surface of the fused metal object as a nickel metallurgical-bound coating on a surface of the stainless steel fused metal object. Notably, even though the shaping composition is shown in this example as being applied to a top surface of the span, the shaping composition could be applied anywhere, depending on the effect that is to be achieved by the shaping composition.

Methods of Shaping and Heat-Fusing Green Body Objects

Figure 5:
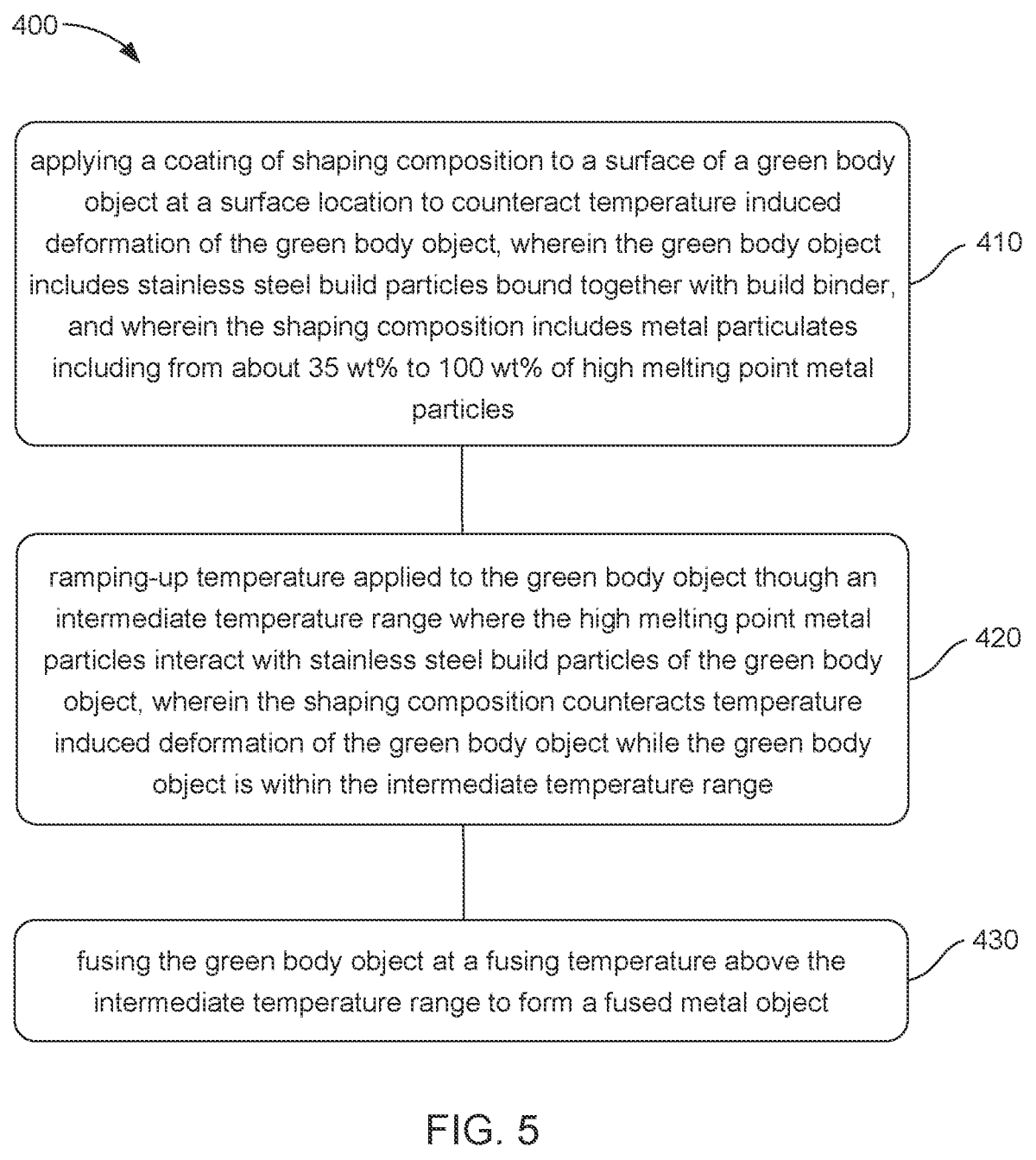

In an example of the present disclosure, and as shown in a flow diagram in FIG. 5, a method 400 of controlling green body object deformation can include applying 410 a coating of shaping composition to a surface of a green body object at a surface location to counteract temperature induced deformation of the green body object. The green body object can include stainless steel build particles bound together with build binder, and the shaping composition can include metal particulates including from about 35 wt % to 100 wt % of high melting point metal particles. The method can further include ramping-up 420 a temperature applied to the green body object though an intermediate temperature range where the high melting point metal particles interact with stainless steel build particles of the green body object. The shaping composition can counteract temperature induced deformation of the green body object that may occur while the green body object is within the intermediate temperature range. The method can further include fusing 430 the green body object at a fusing temperature above the intermediate temperature range to form a fused metal object. In one example, the method can further include forming the green body object by iteratively applying individual stainless steel build material layers of a stainless steel build material including the stainless steel build particles, and based on the three-dimensional object model, selectively applying a binding agent to individual stainless steel build material layers to define individually patterned layers that are built up and bound together to form the green body object. In another example, the shaping composition can also include from about 10 wt % to about 65 wt % aluminum alloy particles and/or from about 0.1 wt % to about 10 wt % metal complex selected from an inorganic metal salt, an organic metal salt, or a metal oxide, wherein the metal of the metal complex includes copper, iron, aluminum, chromium, titanium, cobalt, silver, gold, nickel, tin, or zinc. In some instances, the method can include removing residual components of the shaping composition from the fused metal object. However, in other examples, the high melting point metal particles (or a portion thereof) can become integrated onto a surface of the fused metal object.

Binders

There are two compositions described herein that can utilize a binder in accordance with the present disclosure, e.g., the build binder in the binding agent used for the three-dimensional printing kit and/or three-dimensional printing processes described herein and the shaping binder that may be present in the shaping composition. With respect to build binder, a binding agent can include a liquid vehicle and a build binder. The build binder can be carried by a liquid vehicle for jetting from jetting architecture, for example. The build binder can be present in the binding agent at from about 1 wt % to about 30 wt %, for example. With shaping composition, the shaping binder can be co-dispersed with metal particles and may also include a liquid vehicle to form a slurry, for example. The shaping binder can be present in the shaping composition at from about 2 wt % to about 30 wt %, or at the other weight ranges previously described, for example. Thus, the description of the "binder" (or binder compound) herein is relevant to both build binder found in binding agents as well as shaping binder found in shaping compositions. When describing "binder," it is understood to include a description of both types of binder.

Regarding the binder, any of a number of binders can be used, including metal binders or polymeric binders. In other words, the term "binder" or "binder compound" can include any material used to physically bind metal particles together initially, but often for a period of time during heating in a fusing oven or furnace. With specific reference to metal binder, the metal can be in the form of a reducible-metal compound binder. To illustrate, if stainless steel is used as metal build particles in the stainless steel build material, or as the secondary metal alloy in the shaping composition, the reducible-metal compound binder may be an iron oxide or salt, a chromium oxide or salt, or a copper oxide, for example. The reducible-metal compound binder can be reduced by hydrogen released from a thermally activated reducing agent in some examples. More general examples of reducible-metal compound binders can include metal oxides (from one or multiple oxidation states), such as a copper oxide, e.g., copper (I) oxide or copper (II) oxide; an iron oxide, e.g., iron(II) oxide or iron(III) oxide; an aluminum oxide, a chromium oxide, e.g., chromium(IV) oxide; titanium oxide, a silver oxide, zinc oxide, etc. As a note, due to variable oxidation states of transition metals, they can form various oxides in different oxidation states, e.g., transition metals can form oxides of different oxidation states. Other examples can include organic or inorganic metal salts. In particular, inorganic metal salts that can be used include metal bromides, metal chlorides, metal nitrates, metal sulfates, metal nitrites, metal carbonates, or a combination thereof. Organic metal salts can include chromic acid, chrome sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethanesulfonate, silver nitrate, sodium zincate, stannous chloride (or tin(II) chloride), stannous sulfate (or tin(II) sulfate, zinc chloride, zinc cyanide, tin methanesulfonate, for example. In some instances, the reducible-metal compound binder can be in the form of a nanoparticle, and in other instances, the reducible-metal compound binder can be disassociated or dissolved in the aqueous liquid vehicle. As particles, the reducible-metal compound binder can have a D50 particle size from about 10 nm to about 10 μm, from about 10 nm to about 5 μm, from about 10 nm to about 1 μm, from about 15 nm to about 750 nm, or from about 20 nm to about 400 nm.

Metal binder can be reducible as a result of introduced atmosphere with a reducing agent, and/or can be thermally activated, for example. Thermally activated reducing agent that can be used may be sensitive to elevated temperatures. Example thermally activated reducing agents can include hydrogen ($H_2$), lithium aluminum hydride, sodium borohydride, a borane (e.g., diborane, catecholborane, etc.) sodium hydrosulfite, hydrazine, a hindered amine, 2-pyrrolidone, ascorbic acid, a reducing sugar (e.g., a monosaccharide), diisobutylaluminium hydride, formic acid, formaldehyde, or mixtures thereof. The choice of reducing agent can be such that it is thermally activated at a temperature, or can be introduced at a temperature where reduction of the metal binder may be desired. By way of example, if considering using a metal oxide nanoparticle as the reducible-metal compound binder, there may be metal oxides that are stable (or relatively unreactive) at room temperature, but upon application of heat, e.g., 200° C. to 1000° C. or 250° C. to 1000° C. or from 300° C. to 700° C., a redox-reaction can result in the production of the pure metal or metal alloy. As an example, mercury oxide or silver oxide can be reduced to their respective elemental metal by heating to about 300° C., but the presence of a reducing agent may allow the reaction to occur at a lower temperature, e.g., about 180° C. to about 200° C. Oxides of more reactive metals like zinc, iron, copper, nickel, tin, or lead may likewise be reduced simply in the presence of a reducing agent, so the reducing agent can be introduced into the fusing oven or furnace at a time where binding properties may be beneficial. Reducing agents, whether thermally activated or reactive without added temperature can be capable of providing hydrogen moieties completing the redox-reaction at elevated temperatures in accordance with examples of the present disclosure. An example of one reaction is shown in Formula 1, as follows:

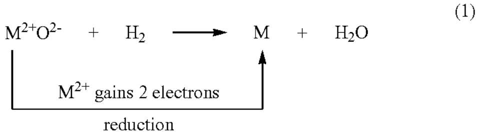

(1)

In other examples, the binder or binder compound can be a polymeric binder, such as latex particles, for example. The polymer binder or polymerizable binder can be a polymer that can have different morphologies. In one example, the polymer binder or polymerizable binder can include a uniform composition, e.g. a single monomer mixture, or can include two different compositions, e.g. multiple monomer compositions, copolymer compositions, or a combination thereof, which may be fully separated core-shell polymers, partially occluded mixtures, or intimately comingled as a polymer solution. In another example, the polymer binder or polymerizable binder can be individual spherical particles containing polymer compositions of hydrophilic (hard) component(s) and/or hydrophobic (soft) component(s). For example, a core-shell polymer can include a more hydrophilic shell with a more hydrophobic core or a more hydrophobic shell with a more hydrophillic core. With respect to "more hydrophilic" and "more hydrophobic" the term more is a relative term that indicates a hydrophillic or hydrophobic property when considering the core composition and the shell composition in respect to one another.

In some examples, the polymer binder or polymerizable binder can include latex particles. The latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein. In some examples, the latex particles can be produced by emulsion polymerization. The latex particles in the binding agent can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth)acrylate, butyl acrylate, butyl (meth)acrylate, ethyl acrylate, ethyl (meth) acrylate, propyl acrylate, propyl (meth)acrylate, 2-ethylhexyl acrylate, 2-ethylhexyl (meth)acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth) acrylate, benzyl (meth)acrylate, benzyl acrylate, ethoxylated nonyl phenol (meth)acrylate, isobornyl (meth)acrylate, cyclohexyl (meth)acrylate, trimethyl cyclohexyl (meth) acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth)acrylate, diacetone acrylamide, diacetone (meth)acrylamide, N-vinyl imidazole, N-vinylcarbazole, N-vinyl-caprolactam, combinations thereof, derivatives thereof, or mixtures thereof. These monomers include low glass transition temperature (Tg) monomers that can be used to form the hydrophobic component of a heteropolymer.

In other examples, the latex particles can include acidic monomers that can be used to form the hydrophilic component of a heteropolymer. Example acidic monomers that can be polymerized in forming the latex particles can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidenelactic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryloyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof. In some examples, the acidic monomer content can range from about 0.1 wt % to about 15 wt %, from about 0.5 wt % to about 12 wt %, or from about 1 wt % to about 10 wt % of the latex particles with the remainder of the latex particles being composed of non-acidic monomers. In some examples the acid monomer can be concentrated towards an outer surface of a latex particle.

The latex particles can have various molecular weights, sizes, glass transition temperatures, etc. In one example, the polymer in the latex particles can have a weight average molecular weight ranging from about 10,000 Mw to about 500,000 Mw, from about 100,000 Mw to about 500,000 Mw, or from about 150,000 Mw to about 300,000 Mw. The latex particles can have a particle size that can be jetted via thermal ejection or printing, piezoelectric ejection or printing, drop-on-demand ejection or printing, continuous ejection or printing, etc. In an example, the particle size of particles of the polymer binder or polymerizable binder can range from about 10 nm to about 400 nm. In yet other examples, a particle size of polymer binder or polymerizable binder can range from about 10 nm to about 300 nm, from about 50 nm to about 250 nm, from about 100 nm to about 300 nm, or from about 25 nm to about 250 nm. In some examples, the latex particle can have a glass transition temperature that can range from about −20° C. to about 130° C., from about 60° C. to about 105° C., or from about 10° C. to about 110° C.

Liquid Vehicles

Liquid vehicles described herein can refer to the liquid vehicle used for the jettable binding agent of the liquid component of the liquid used in the shaping composition. As an initial matter, the shaping composition can be a liquid vehicle of water. In other examples, there can be other components along with the water, such as organic co-solvent, surfactant, biocide, etc. The liquid vehicle in the shaping composition can be included at from about 10 wt % to about 80 wt %, from about 15 wt % to about 60 wt %, from about 20 wt % to about 50 wt %, or from about 25 wt % to about 50 wt %, for example. Other percentages of the liquid vehicle, such as water or water and other liquid components, can be used, depending on how the shaping composition is to be applied, e.g., dipping, spraying, etc., and may include more liquid vehicle component, whereas spreading of a more viscous composition may include less liquid vehicle component. In further detail, many of the components described below with respect to the binding agent can likewise be used in formulating the liquid vehicle of the shaping composition, and those components are incorporated herein by reference.

Regarding the jettable binding agent, there can be some care taken with respect to formulating a binding agent that is jettable, particularly if it is to be thermally jettable. In this example, the binding agent can include a build binder dispersed in an aqueous vehicle, such as a vehicle including water as a major solvent, e.g., the solvent present at the highest concentration compared to other co-solvents. Apart from water, the aqueous vehicle can include organic co-solvent(s), such as high-boiling solvents and/or humectants, e.g., aliphatic alcohols, aromatic alcohols, alkyl diols, glycol ethers, polyglycol ethers, 2-pyrrolidinones, caprolactams, formamides, acetamides, and long chain alcohols. Some other more specific example organic co-solvents that can be included in the binding agent can include aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, substituted formamides, unsubstituted formamides, substituted acetamides, unsubstituted acetamides, and combinations thereof. Some water-soluble high-boiling solvents can act as coalescing aids for latex particles. Example water-soluble high-boiling solvents can include propyleneglycol ethers, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone and 2-methyl-1,3-propanediol. The organic co-solvent(s) in aggregate can include from 0 wt % to about 50 wt % of the binding agent. In some examples, co-solvents can be present at from about 5 wt % to about 25 wt %, from about 2 wt % to about 20 wt %, or from about 10 wt % to about 30 wt % of the binding agent. In some examples, the binding agent can further include from about 0.1 wt % to about 50 wt % of other liquid vehicle components. These liquid vehicle components can include other organic co-solvents, additives that inhibit growth of harmful microorganisms, viscosity modifiers, pH adjusters, sequestering agents, surfactants, preservatives, etc. Regardless of the formulation, the aqueous vehicle can be present in the binding agent at from about 20 wt % to about 98 wt %, from about 70 wt % to about 98 wt %, from about 50 wt % to about 90 wt %, or from about 25 wt % to about 75 wt.

Some example liquid vehicle components that can inhibit the growth of harmful microorganisms that can be present can include biocides, fungicides, and other microbial agents, which are routinely used in ink formulations. Commercially available examples can include ACTICIDE® (Thor GmbH), NUOSEPT® (Troy, Corp.), UCARCIDE™ (Dow), VANCIDE® (R.T. Vanderbilt Co.), PROXEL® (Arch Biocides), and combinations thereof.

Stainless Steel Build Materials

The stainless steel build material can include metal build particles of any type that can be fused together at a fusing temperature (above the temperature at which the green body is formed). Fusing can be carried out by sintering, annealing, melting, or the like, metal build particles together within the stainless steel build material. In one example, the stainless steel build material can include from about 80 wt % to 100 wt % of the stainless steel build particles based on a total weight of the stainless steel build material.

In an example, the stainless steel build particles can be a single phase metallic material composed of one alloy, e.g., stainless steel as a single phase metallic alloy. Thus, there may be various particles as alloys, or a multiple phase metallic alloy, e.g. different particles can include different metals, in the form of composites, e.g., core-shell metal particles. In these examples, fusing generally can occur over a range of temperatures. With respect to stainless steel and other alloys or elemental metals that may be present, materials with a metal alloyed to a non-metal (such as a metal-metalloid alloy) can be used as well. In some examples, the stainless steel build particles can include other particles, e.g., up to 20 wt %, of elemental metals or alloys of copper, titanium, cobalt, chromium, nickel, vanadium, tungsten, tantalum, molybdenum, iron, stainless steel, steel, or an admixture thereof. In one example, the metal build particles can be copper or a copper alloy, for example.

The D50 particle size of the various build particles can range from about 1 μm to about 150 μm. In some examples, the particles can have a D50 particle size distribution value that can range from about 10 μm to about 100 μm, from about 20 μm to about 150 μm, from about 15 μm to about 90 μm, or from about 50 μm to about 150 μm. Individual particle sizes can be outside of these ranges, as the "D50 particle size" is defined as the particle size at which half of the particles are larger than the D50 particle size and about half of the other particles are smaller than the D50 particle size (by weight based on the metal particle content of the stainless steel build material).

As used herein, particle size can refer to a value of the diameter of spherical particles or in particles that are not spherical can refer to a longest dimension of that particle. The particle size can be presented as a Gaussian distribution or a Gaussian-like distribution (or normal or normal-like distribution). Gaussian-like distributions are distribution curves that can appear Gaussian in their distribution curve shape, but which can be slightly skewed in one direction or the other (toward the smaller end or toward the larger end of the particle size distribution range). That being stated, an example Gaussian-like distribution of the metal build particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values may not be related to Gaussian distribution curves, but in one example of the present disclosure, the metal build particles can have a Gaussian distribution, or more typically a Gaussian-like distribution with offset peaks at about D50. In practice, true Gaussian distributions are not typically present, as some skewing can be present, but still, the Gaussian-like distribution can be considered to be "Gaussian" as used in practice. The shape of the particles of the stainless steel build material can be spherical, non-spherical, random shapes, or a combination thereof.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of compositions including multiple components where the different compositions can be separately contained in the same or multiple containers prior to and during use, e.g., building a three-dimensional object, but these components can be combined together during a build and/or shaping process. The containers can be any type of a vessel, box, or receptacle made of any material. Alternatively, a kit may be generated during the process of three-dimensional building a portion at a time. For example, the stainless steel build material can be decontaminated a layer at a time to form a "kit" of a decontaminated (portion) or a stainless steel build material that, when combined with the binding agent to be ejected thereon, completes the kit, e.g., a layer of decontaminated build material formed on a build platform or support bed is considered to be a kit when combined with a binding agent loaded in a three-dimensional printing system for ejection thereon.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Green Body Object Sample Preparation

Multiple green body objects of various sizes are prepared using a three-dimensional printing process similar to that shown in FIG. 3 to form green body objects similar to that shown in FIG. 4. The shapes prepared included supports on two opposite sides with a spanned portion therebetween to evaluate the effect of gravity-induced deformation or sagging during heating, and the ameliorating of sagging during heating using shaping compositions in accordance with the present disclosure. The two types of structures prepared included a 33 mm span with a vertical thickness of the span being either 5.7 mm or 2.8 mm. The green body objects formed were prepared using stainless steel particles having a purity of about 100 wt % and a D50 particle size of about 22 μm. The binding agent used to form the green body object was a latex polymer binder ejected from a thermal jetting apparatus as a binding agent. The green body objects were cured using a temperature, Tcure, of about 120-180° C.

Example 2—Preparation of Shaping Composition with Polymer Shaping Binder

Five different shaping compositions were prepared, as set forth in Table 2 below:

TABLE 2

Example Metal Particle Formulations

| Metal Particles Formulation ID | High Melting Point Metal Particles (wt %) | Aluminum Alloy Particles (wt %) | Metal Complex (wt %) |
|---|---|---|---|
| 1 | [1]Stainless Steel (70) | [3]AlSiMg (28) | $Al_2O_3$ (2) |
| 2 | [2]Ti6Al4V (63) | [3]AlSiMg (35) | $Al_2O_3$ (2) |
| 3 | [3]AlSiMg (100) | — | — |
| 4 | [4]Cast Iron (100) | — | — |
| 5 | [5]Nickel (100) | — | — |

[1]Iron (balance); Chromium 16-18 wt %; Nickel 10-14 wt %; Molybdenum 2-3 wt %; Manganese 2 wt % (max); Silicon 1 wt % (max); Phosphorus 0.045 wt % (max); Carbon 0.03 wt % (max); and Sulfur 0.03 wt % (max).

[2]Titanium 90 wt %; Aluminum 6 wt %; and Vanadium 4 wt %.

[3]Aluminum (balance); Silicon 9-11 wt %, Iron 0.55 wt % (max); Manganese 0.45 wt % (max); Magnesium 0.2-0.45 wt %, Titanium 0.15 wt % (max); Zinc 0.1 wt % (max); Copper 0.05 wt % (max); Lead 0.05 wt % (max); Nickel 0.05 wt % (max); and Tin 0.05 wt % (max).

[4]Iron (balance); Carbon 3 wt % (max); Silicon 5 wt % (max); Phosphorus 5 wt % (max); and Manganese 1 wt % (max).

[5]Nickel (balance); Carbon 0.01 wt %; Oxygen 0.33 wt %; Iron 0.12 wt %; Sulfur 0.003 wt %.

The metal particles set forth in Table 2 were shaped using water for this experiment, but in some examples, could be shaped or printed using a binding agent of about 25 wt % of a latex dispersion to provide about 5 wt % latex binder particle content, for example. The shaping composition is thus in the form of a thickened slurry. Notably, other levels of shaping binder content and/or metal particles can be used that may also be sufficient to generate a slurry.

Example 3—Green Body Object Gravity-Induced Deformation During Sintering

A green body object was prepared and sintered without the use of any shaping composition to determine how much deformation would occur. In this study, both stainless steel green body objects were evaluated, including the one that was 5.7 mm thick and the one that was 2.8 mm thick. Once the green body objects were printed, the green body objects were placed in a fusing oven, ramped up through intermediate temperatures to arrive at a sintering temperature of about 1380° C., where the object was heat soaked for 2 hours. More specifically, the heating profile was as follows: heating at 2° C./min room temperature to 400° C.→4 hours hold (heat soaking)→heating at 2° C./min to 750° C./min→4 hours hold (heat soaking)→heating at 2° C./min to 1000° C./min→1 hour hold (heat soaking)→heating at 2° C./min to 1380° C./min→2 hours hold (heat soaking) →cooled in furnace to room temperature. The atmosphere of the sintering oven was $ArH_2$. The fused metal object formed that was from the green body object with a 5.7 mm thick span exhibited a deflection of about 13°, and the sample that was 2.8 mm thick along the span exhibited a deflection of about 16°. The angle of deflection is shown by way of example at 250 in FIG. 4. The Archimedes density of the fused metal objects was about 7.4 g/cc (92-94% relative density).

Example 4—Reduction of Green Body Object Gravity-Induced Deformation Using Shaping Composition with Metal Particles Formulation 1

In this example, the same procedure set forth in Example 3 was carried out, except that from about 0.2 to 0.8 g of the slurry of containing Metal Particles Formulation 1 (stainless steel as high melting point metal particles) was applied evenly along a top surface of the 5.7 mm thick span of the green body object and then baked at 100° C. for 10-15 minutes to dry the shaping composition prior to placing the green body object in the sintering oven. After heat fusing in accordance with that described in Example 3, the stainless steel part retained its shape with just a slight upward bow along the span. The bottom surface of the fused metal object showed no cracking or irregularities, and the residual components of the shaping composition were easily removed with some sand blasting.

Example 5—Reduction of Green Body Object Gravity-Induced Deformation Using Shaping Composition with Metal Particles Formulation 2

In this example, the same procedure set forth in Example 3 was carried out, except that from about 0.2 to 0.6 g of the slurry of containing Metal Particles Formulation 2 (Ti6Al4V as the high melting point metal particles) was applied evenly along a top surface of both the 5.7 mm thick span and the 2.8 mm thick span of the green body object and then baked at 100° C. for 10-15 minutes to dry the shaping composition prior to placing the green body object in the sintering oven. After heat fusing in accordance with that described in Example 3, the effect of application of the shaping composition on 5.7 mm and 2.8 mm thick spans significantly reduced sagging or in some instances, no sagging occurred. The intermetallic coating was observed in one instance (with a 5.7 mm thick span) to have expanded laterally to leave a short cantilevered region extending beyond one end of the fused metal object. The residual components from the shaping composition were peeled from the top surface of the fused metal object.

Example 6—Reduction of Green Body Object Gravity-Induced Deformation Using Shaping Composition with Metal Particles Formulation 3

In this example, the same procedure set forth in Example 3 was carried out, except that from about 0.05 to 0.3 g of the slurry of containing Metal Particles Formulation 3 (aluminum-silicon-magnesium as high melting point metal particles) was applied evenly along a top surface of the 5.7 mm thick span of the green body object and then baked at 100° C. for 10-15 minutes to dry the shaping composition prior to placing the green body object in the sintering oven. After heat fusing in accordance with that described in Example 3, the stainless steel part retained its shape with no significant distortion. The bottom surface of the fused metal object showed no cracking or irregularities, and the residual components of the shaping composition were easily removed with some sand blasting.

Example 7—Reduction of Green Body Object Gravity-Induced Deformation Using Shaping Composition with Metal Particles Formulation 4

In this example, the same procedure set forth in Example 3 was carried out, except that from about 0.2 to 0.8 g of the slurry of containing Metal Particles Formulation 4 (cast iron as high melting point metal particles) was applied evenly along a top surface of the 5.7 mm thick span of the green body object and then baked at 100° C. for 10-15 minutes to dry the shaping composition prior to placing the green body object in the sintering oven. After heat fusing in accordance with that described in Example 3, the stainless steel part only slightly sagged along the span, but was significantly less than the 5.7 mm thick span of Example 3. The bottom surface of the fused metal object showed no cracking or irregularities, and the residual components of the shaping composition were easily removed with some sand blasting.

Example 8—Reduction of Green Body Object Gravity-Induced Deformation Using Shaping Composition with Metal Particles Formulation 5

In this example, the same procedure set forth in Example 3 was carried out, except that from about 0.1 to 0.6 g of the slurry of containing Metal Particles Formulation 5 (nickel as high melting point metal particles) was applied evenly along a top surface of the 5.7 mm thick span of the green body object and then baked at 100° C. for 10-15 minutes to dry the shaping composition prior to placing the green body object in the sintering oven. After heat fusing in accordance with that described in Example 3, the stainless steel part retained its shape with just a very slight upward bow along the span. The bottom surface of the fused metal object showed no cracking or irregularities, and the residual components of the shaping composition were easily removed with some sand blasting. Nickel has a higher melting temperature (1455° C.) than the sintering temperature of stainless steel, thus, in this example, the nickel remained solid during the sintering process and became integrated as a coating on a surface of the fused metal object.

While the present technology has been described with reference to certain examples, various modifications, changes, omissions, and substitutions can be made without departing from the disclosure.

What is claimed is:

1. A three-dimensional printing kit, comprising:

a stainless steel build material comprising from about 80 wt % to 100 wt % of stainless steel build particles having a D50 particle size distribution value of from about 1 μm to about 150 μm;

a binding agent including a build binder to apply to stainless steel build material layers to form a green body object; and a shaping composition to apply to a surface of the green body object and to control green body object deformation, the shaping composition including:

from about 10 wt % to about 80 wt % of a liquid vehicle; and from about 20 wt % to about 90 wt % of metal particulates, the metal particulates including from about 35 wt % to 70 wt % of high melting point metal particles and from 28 wt % to 35 wt % of aluminum alloy particles, wherein the metal particulates are interactive with a surface of the green body object such that the green body object retains its shape within an intermediate temperature range where the build binder does not enable retention of the green body object shape prior to the stainless steel build particles becoming heat-fused.

2. The three-dimensional printing kit of claim 1, wherein the high melting point metal particles are metal alloy particles.

3. The three-dimensional printing kit of claim 1, wherein the shaping composition further includes from about 0.1 wt % to about 10 wt % of a metal complex selected from the group consisting of an inorganic metal salt, an organic metal salt, and a metal oxide, and wherein a metal of the metal complex is selected from the group consisting of copper, iron, aluminum, chromium, titanium, cobalt, silver, gold, nickel, tin, and zinc.

4. The three-dimensional printing kit of claim 1, wherein the high melting point metal particles are selected from the group consisting of stainless steel particles, Ti-6Al-4V particles, aluminum-silicon-magnesium particles, cast iron particles, nickel particles, and a combination thereof.

5. The three-dimensional printing kit of claim 1, wherein the shaping composition is jettable and has a viscosity ranging from about 50 cps to about 500 cps.

6. The three-dimensional printing kit of claim 1, wherein the shaping composition is a slurry having a viscosity ranging from about 2000 cps to about 5000 cps.

7. A method of controlling green body object deformation, the method comprising:

forming a green body object by:

iteratively applying individual build material layers of a stainless steel build material comprising from about 80 wt % to 100 wt % of stainless steel build particles having a D50 particle size distribution value of from about 1 μm to about 150 μm; and based on the three-dimensional object model, selectively applying a binding agent to the individual build material layers to define individually patterned layers that are built up and bound together to form the green body object, wherein the binding agent includes a build binder;

applying a coating of a shaping composition to a surface of a green body object to control green body object deformation, wherein the green body object includes the stainless steel build particles bound together with the build binder, and wherein the shaping composition includes:

from about 10 wt % to about 80 wt % of a liquid vehicle; and from about 20 wt % to about 90 wt % of metal particulates, the metal particulates including from about 35 wt % to 70 wt % of high melting point metal particles and from 28 wt % to 35 wt % of aluminum alloy particles;

ramping-up a temperature applied to the green body object though an intermediate temperature range where the high melting point metal particles interact with the stainless steel build particles of the green body object such that the green body object retains its shape within the intermediate temperature range where the build binder does not enable retention of the green body object shape prior to becoming heat-fused; and heat-fusing the green body object at a fusing temperature that is above the intermediate temperature range to form a fused metal object.

8. The method of claim 7, wherein the shaping composition further includes from 2 wt % to about 10 wt % of a metal complex selected from the group consisting of an inorganic metal salt, an organic metal salt, and a metal oxide, wherein a metal of the metal complex is selected from the group consisting of copper, iron, aluminum, chromium, titanium, cobalt, silver, gold, nickel, tin, and zinc.

9. The method of claim 7, further comprising removing residual components of the shaping composition from the fused metal object.

10. The method of claim 7, wherein the high melting point metal particles become integrated onto a surface of the fused metal object.

* * * * *